(12) United States Patent
Woolner et al.

(10) Patent No.: US 7,325,580 B2
(45) Date of Patent: Feb. 5, 2008

(54) SAFETY SYSTEM FOR CONSTRAINING CROSSBEAMS IN A BELT SPLICER

(75) Inventors: Lawrence Bruce Woolner, Parry Sound (CA); Mark Linus Dudas, Parry Sound (CA); James Conwell Shaw, Parry Sound (CA)

(73) Assignee: Shaw-Almex Industries Ltd.

( * ) Notice: Subject to any disclaimer, the term of this patent is extended or adjusted under 35 U.S.C. 154(b) by 463 days.

(21) Appl. No.: 11/086,277

(22) Filed: Mar. 23, 2005

(65) Prior Publication Data

US 2006/0213618 A1   Sep. 28, 2006

(51) Int. Cl.
*B29C 65/02* (2006.01)
*B30B 1/34* (2006.01)

(52) U.S. Cl. .............. 156/502; 156/304.6; 100/269.03; 100/269.17

(58) Field of Classification Search ............... 156/157, 156/159, 304.6, 502; 100/269.03, 269.17; 24/37
See application file for complete search history.

(56) References Cited

U.S. PATENT DOCUMENTS

| | | | | |
|---|---|---|---|---|
| 2,248,499 A | * | 7/1941 | Heintz | 425/11 |
| 3,355,343 A | * | 11/1967 | Beck | 156/304.7 |
| 3,808,968 A | * | 5/1974 | Notin | 100/264 |
| 4,430,146 A | * | 2/1984 | Johnson | 156/502 |
| 4,554,043 A | * | 11/1985 | Fudickar et al. | 156/502 |
| 4,557,791 A | * | 12/1985 | Fudickar et al. | 156/580 |
| 4,609,100 A | * | 9/1986 | Fudickar et al. | 198/832.3 |
| 4,946,541 A | * | 8/1990 | Thies et al. | 156/580 |
| 6,848,571 B2 | * | 2/2005 | Allen et al. | 198/844.2 |

* cited by examiner

*Primary Examiner*—Mark A Osele
(74) *Attorney, Agent, or Firm*—Anthony Asquith Corp.

(57) ABSTRACT

In a belt splicer, having crossbeams straddling over and under the splice area, and having tie-bolts holding the ends of the crossbeams together, the safety system comprises link-spacers which link the crossbeams together. The link-spacers are profiled complementarily to the crossbeams, whereby the link-spacers can slide relative to the crossbeams. If a tie-bolt should fail, the cross-beams are held in place, relative to the other crossbeams, by the link-spacers.

9 Claims, 6 Drawing Sheets

SAFETY SYSTEM FOR CONSTRAINING CROSSBEAMS IN A BELT SPLICER

This specification relates to a splicer for conveyor belts.

Typically, conveyor belts are spliced by a procedure that is carried out on-site, i.e at the location where the belt will be operated.

Traditionally, the belt splicer has included a structure for holding the two ends of the belt together in an overlapping relationship, and has included heaters for heating the uncured rubber and/or adhesive used to glue the two ends together, and has included a pressure pad for squeezing the spliced area together during heating and curing. This structure has typically included also a cooler, for cooling the splice quickly. The new apparatus is for use in such installations.

The traditional belt splicer has utilized a pair of crossbeams that straddle across the splice area of the belt, an over-crossbeam above the belt, and an under-crossbeam below the belt. The crossbeams are restrained, at their left and right ends, by left and right tie-bolts. The tie-bolts hold the ends of the crossbeams in the correct spatial relationship against the forces arising from the pressure pad. Usually, the splicer includes several of the crossbeams, in over/under pairs, each pair with respective left and right tie-bolts.

It has occasionally happened that a tie-bolt might fracture. The reason is not so much a straight overload, but rather that the tie-bolts have been damaged. The equipment is used in the field, and can be subjected, sometimes, to a great deal of abuse. If a tie-bolt should fracture, it can happen that the now-not-tied crossbeams can fly apart, and can fly apart explosively because of the large amounts of pressure energy stored in the pressure pad. In fact, usually, since the under-crossbeam is constrained by structure underneath the belt, what happens is that the over-crossbeam flies upwards. The risk of injury and damage in that case is all too real—especially in that, during splicing, workers are gathered around the equipment. Sometimes, the pressure pad uses water, rather than air, as the pressurised medium, but even then there can be enough stored energy in the pressure pad to cause the over-crossbeam to jump upwards, if the tie-bolt should fail, with enough force to inflict serious injury on a person.

The tie-bolts have a good safety factor, whereby, even if one of the tie-bolts does fail, the failure is not likely to be due to an overload, but rather to be due to the tie-bolt having being damaged. It can be expected, therefore, that the remaining (undamaged) tie-bolts can cope with the imposed extra force.

It has proved difficult to provide a suitable system for constraining the ends of the crossbeams against flying apart in the event of a tie-bolt failure. One system that has been used is to provide a safety-bar, which links all the over-crossbeams together; thus, if one tie-bolt fails, the affected one of the over-crossbeams is prevented from flying upwards by being physically linked, by the safety-bar, to the remaining over-crossbeams, which are still held by their respective, still-intact, tie-bolts.

One of the problems with the traditional safety-bar system is that the safety-bar is simply a length of metal bar or rod, which all too easily becomes separated from the rest of the splicer equipment when not in use. If that happens, the temptation to simply leave the safety-bar out can be too high.

In the new apparatus as disclosed herein, the crossbeams are constrained against flying apart, in the event of failure of a tie-bolt, in a manner that is a better compromise than in previous designs.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

When making a splice in a conveyor belt, typically the ends to be spliced are prepared by separating and peeling back the layers or plies of the belt, and then sticking the plies from the two ends together, face to face. The adhesive that is typically used has to be vulcanised, which means heating (and cooling) the splice area, while applying a heavy compressive force. Desirably, the joint, without resorting to an increased thickness, should be the equal of the belt itself, in terms of tensile strength, flexibility of bending, length of service life, etc. Furthermore, the task of splicing has to be carried out in the field, and therefore durability, ruggedness, ease of use, ease of servicing, etc, are among the desired attributes of the belt splicer. A splice made by using the apparatus described herein can be expected to be near to this ideal.

Figure 1:
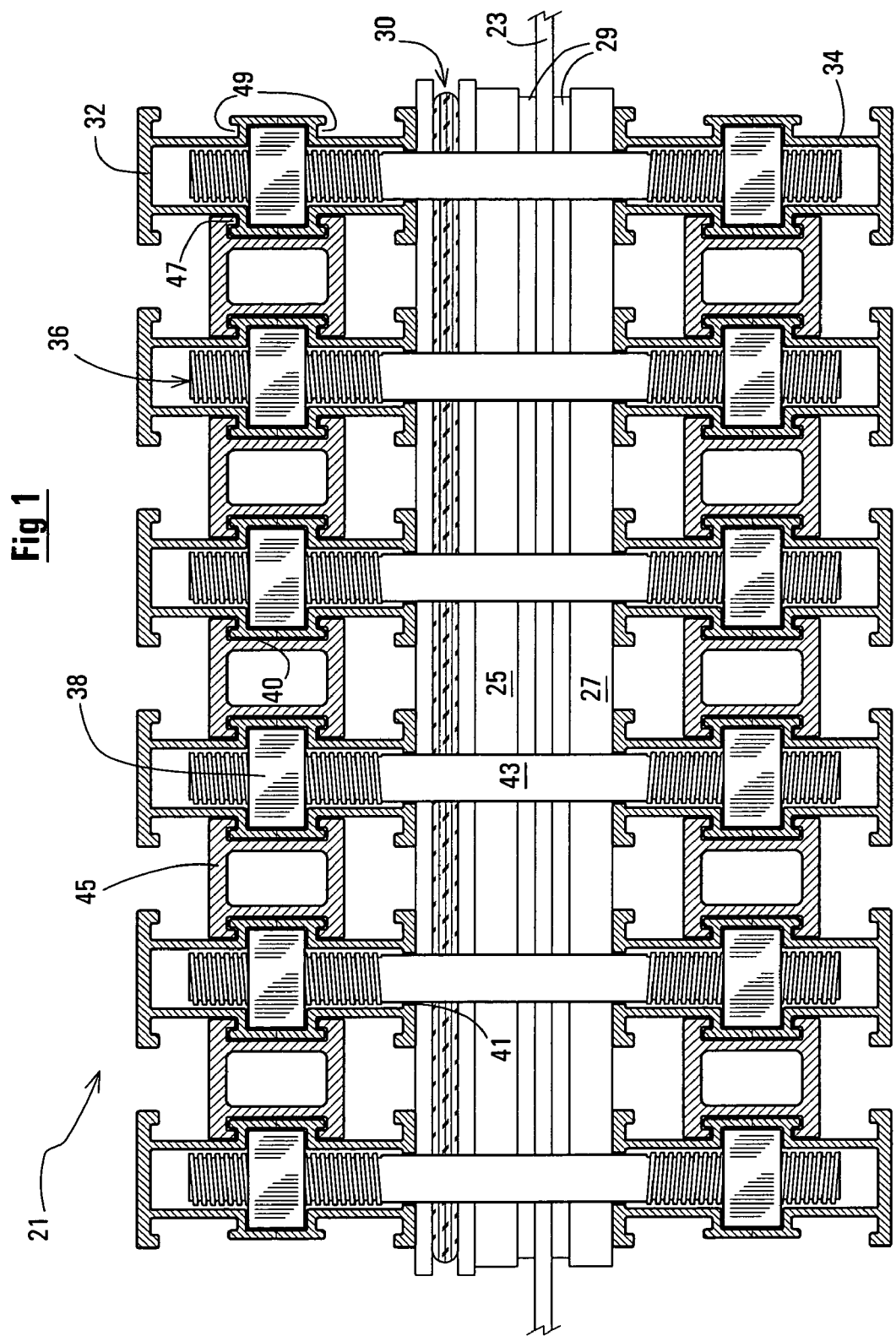
FIG. 1 is a side elevation of a belt splicer apparatus, shown in use on a conveyor belt.
Figure 2:
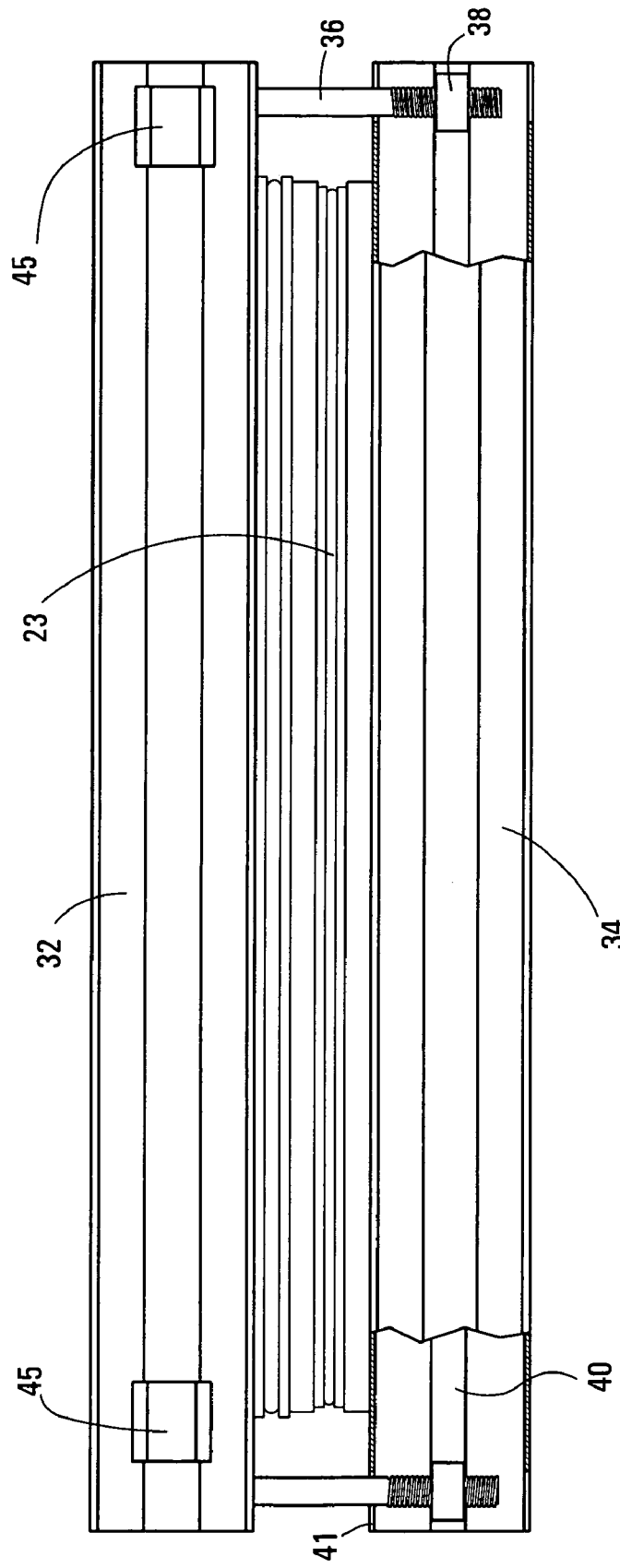
FIG. 2 is an end elevation of the apparatus of FIG. 1.

The splicer apparatus 21 shown in FIGS. 1, 2 operates on the belt 23 that is to be spliced. Over 25 and under 27 heater/cooler platens lie above and below the belt 23. Pads 29 (typically of steel, 3 mm thick) make actual contact with the belt.

Also included is a pressure pad 30. This includes an inflatable bag, which can be inflated either with air or with a liquid. Air is favoured for convenience, but water is favoured for safety because the energy stored in compressed water is much less than that stored in comparably compressed air. When inflated, the pressure pad 30 compresses the splice area of the belt 23, with a force and pressure that is evenly and equally distributed over the splice area.

The forces of compression produced by the pressure pad 30 are reacted against the over 32 and under 34 crossbeams. The crossbeams 32,34 straddle across the belt from left to right. The crossbeams are formed as extrusions in aluminum. Tie-bars in the form of tie-bolts 36 constrain the ends of the crossbeams. The tie-bolts 36 are threaded into complementary nuts 38. The nuts 38 engage inside the (extruded) profiles of the crossbeams 32,34. The crossbeams have extensions protruding left and right with respect to the belt 23, for receiving the nuts 38.

The nuts 38 engage the crossbeams by fitting into recesses 40 inside the side-walls of the crossbeams. The nuts can slide into the recesses end-wise, i.e in the left/right direction with respect to the belt, and once engaged are constrained against all modes of movement relative to the crossbeams, other than that sliding mode. The crossbeams are provided with cut-outs 41 at the lateral ends of the extensions, to accommodate the tie-bolts 36.

The tie-bolts 36 include tie-rods 43, which have opposite-hand threads at their opposite ends (and the two nuts 38 of each tie-bolt 36 are correspondingly oppositely-threaded, of course) whereby turning the tie-rod 43 is effective to draw the two nuts 38 together, like a turnbuckle.

The tie-bolts are shortened to take up the slack. (Preferably, the tie-bolts 36 are not shortened so much that turning the tie-bolt is effective to exert a compression on the components between the crossbeams.) Then, when the pressure pad 30 is just touching the over-crossbeam 32, and the under heating/cooling platen 27 is just touching the under-crossbeam 34, the engineer can inflate the bag 30, and the heavy compression commences.

The pressure pad 30 can be kept inflated at a constant pressure throughout the splicing operation, or the pressure can be varied during the heating and cooling portions of the operating cycle. The engineer sets the parameters in accordance with the requirements of proper and adequate vulcanisation of the adhesive in the splice area.

In accordance with the invention, link-spacers 45 engage between adjacent ones of the crossbeams 32,34. The (extruded) link-spacers 45 are shaped correspondingly to the (extruded) form of the crossbeams. The shapes of the link-spacer and the crossbeams are such that the link-spacer can slide lengthwise along the crossbeams (i.e left/right relative to the belt), but cannot otherwise move relative to the crossbeam in any of the modes of movement. (In this context, the six modes of movement, or degrees of freedom, are the translational movements in three mutually perpendicular directions, and the rotational movements about three mutually perpendicular axes.)

Of course, the profiles of the crossbeams and the link-spacers can have many configurations, all of which will constrain the components against all but the left/right sliding mode of movement. In the example as shown, tongues 47 on the link-spacers engage corresponding opposed grooves 49 in the crossbeams.

The profiles are dimensioned to provide sufficiently ample clearance that there is little chance of the link-spacers snagging or jamming on the crossbeams.

Two of the link-spacers 45 are provided between each adjacent pair of crossbeams, located (as shown in FIG. 2) near the lateral ends of the left and right extensions thereof. The engineer slides the link-spacers 45 into position between adjacent crossbeams prior to actuating the pressure pad 30.

The presence of the link-spacers 45 serves a number of functions. First, they act as simple spacers, i.e they serve to hold the set of over-crossbeams 32 located in their laterally-correctly-spaced positions relative to each other. Second, the link-spacers serve to mechanically link the crossbeams together. The over-crossbeams being linked together as a set by means of the link-spacers, the set of over-crossbeams now becomes a sub-assembly which can be handled and picked up as a convenient unit. (The same is true of the set of under-crossbeams.) (Some of) the link-spacers 45 can be fitted with lifting eyes, whereby a linked set of crossbeams can be picked up and moved as a unit. This ease of handling may be contrasted with the traditional splicers (without link-spacers), in which the crossbeams have to be man-handled individually.

Another benefit of the mechanical linking due to the presence of the link-spacers 45 arises from the fact that a belt-splicing area is often not, or not quite, horizontal. The tall/narrow shape of the crossbeams is such that the crossbeams do tend to topple over when tilted even slightly, and the presence of the link-spacers eliminates that tendency.

A third benefit arising from the presence of the link-spacers 45 is the important safety feature as mentioned. If one of the tie-bolts 36 should fail, the link-spacer 45 constrains the associated over-crossbeam 32 from flying upwards. It may be noted that, in FIG. 1, the link-spacers are not subjected to any forces if all the tie-bolts are in-place and operational; it is only when a tie-bolt fails that the link-spacer is subjected to a heavy force.

One of the problems with performing sophisticated tasks such as belt splicing in the field is that the approach to the task is much more rough and ready (though not irresponsible or unskilled) than the same task done in a factory. Where the in-factory procedure would include formalities, check-lists, etc, the field engineers tend to improvise and make do, and pure safety measures, which detract from getting the job done efficiently, can be overlooked. It should be noted, in this present case, that the provision of the link-spacers 45 in fact does contribute to efficiency, by easing some of the in-the-field handling and setting up difficulties; so the expectation is that the operators will not leave off the link-spacers, as they might tend to do with a purely-safety measure after a period of time with no accidents.

As shown in FIG. 1, the nuts 38 on the tie-bolts 36 lie inside the extruded shape of the crossbeam. By contrast, in FIG. 3, the nuts now lie outside the crossbeams 50, and the nuts themselves serve as the link-spacers 52.

Some of the differences between FIG. 1 and FIG. 3 may be noted as follows:—

Figure 3:
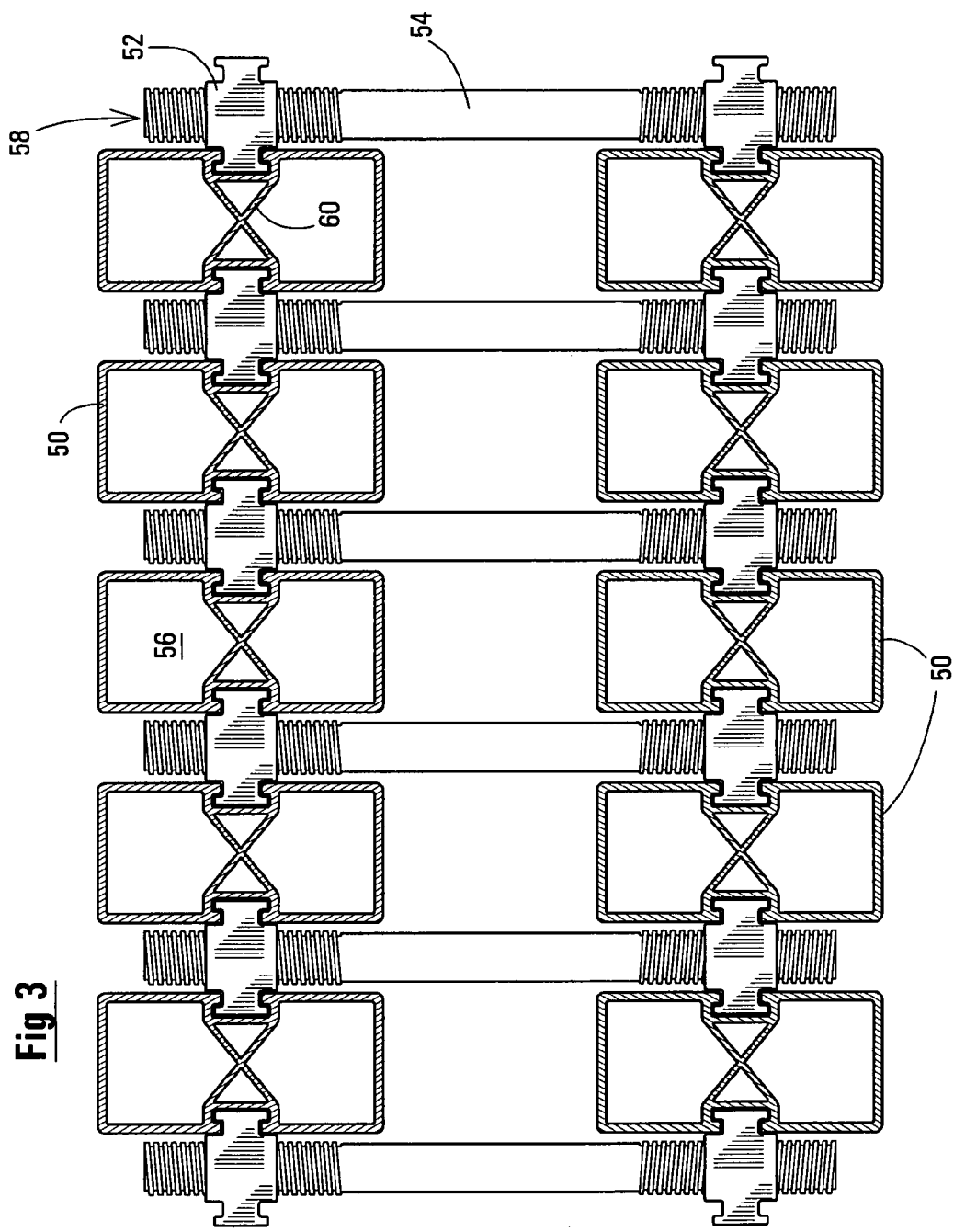
FIG. 3 is a side elevation of another splicer apparatus.

- In FIG. 3, the tie-rods 54 engage directly with the link-spacers 52, and so it is impossible for the link-spacers to be left off the assembly.
- In FIG. 3, it is a simple matter to arrange for the open space 56 in the crossbeam profile to accommodate the rectangular outline of the nut, i.e of the link-spacer 52. Thus, the (assembled) tie-bolts 58 can be stored inside the crossbeams 50 during periods of non-use. As a result, the tie-bolts 58 are unlikely to be lost, or to be used for purposes other than those for which they were designed.
- In FIG. 3, the structure of the nut doubles as the structure of the link-spacer, which is a direct cost saving. On the other hand, an extra tie-bolt is needed in FIG. 3.
- In FIG. 3, the outermost tie-bolts carry only half the load of the intermediate tie-bolts, whereby the outermost tie-bolts are much less likely to be the ones that fail. This is an advantage of FIG. 3, because if any of the tie-bolts were to fail, it would be better if it were not one of the outermost tie-bolts, because the resulting pattern of distortion as the loads fall on the remaining components is much more unpredictable than if one of the intermediate tie-bolts were to fail.
- In FIG. 3, the extruded profile of the crossbeam can include the links 60 joining the centre areas of the crossbeam profile, which gives a large improvement in rigidity.

For the large splicing jobs, there might be thirty or forty pairs of crossbeams and tie-bolts disposed side-by-side along the length of the splice area. The FIG. 1 arrangement might be preferred in such a case. One of the benefits of the FIG. 1 arrangement is that it permits what might be termed a partial mechanical linking of the crossbeams. That is to say, in FIG. 1, the over-set of over-crossbeams can be linked together, and the under-set of under-crossbeams can be linked together, and the linked-together over-set is separate from the linked-together under-set. In FIG. 3, by contrast, in order to link the over-crossbeams together as an over-set, and the under-crossbeams together as a separate under-set, i.e physically separate from the over-set, it would be necessary to unscrew the tie-rods 54 from the nuts—which would be highly inconvenient. The tie-rods being screwed into the nuts (the nuts in FIG. 3 being unitary with the link-spacers 52), when the crossbeams of one of the sets are linked to each other, inevitably the crossbeams of the other set are also linked to each other, and the two sets are linked to each other by the tie-bolts. This can be inconveniently too much linking, in FIG. 3, from the standpoint of ease of assembly and installation.

The benefits of the FIG. 3 arrangement, mainly of ensuring that the apparatus cannot function at all unless all the safety components are present, may be offset against its somewhat more restricted manner of in-situ installation and assembly. It may be regarded that the FIG. 3 arrangement is more suitable for the simple, small, informal work, and FIG. 1 for the larger jobs, which are done with more formality (as to procedures, operator control, etc.) FIG. 3 does ensure that all the safety components must be present, because all the components have to be present and in place in order for the assembly as a whole to function; in FIG. 1, it is possible (but not, of course, likely) for the operators to omit one or more of the spacers, and to leave it to chance that the tie-bolts will not fail.

As regards the FIG. 1 arrangement, the assembly and operation procedure might typically include the following instructions:—

Using the link-spacers, link the under-set of crossbeams together as an under-set, and place that assembled under-set in place under what will be the splice area.

Place the heater/cooler under-platen on the now-in-place under-set of linked under-crossbeams.

Place the two free ends of the belt over the under-platen, in the correct ready-for-splicing juxtaposition.

Prepare the ends of the belt for splicing.

Place the heater/cooler over-platen and pressure pad over the now-prepared splice area.

Using the link-spacers, link the over-crossbeams together as an over-set, and lower that over-set of linked over-crossbeams down onto the belt, i.e onto the already-assembled components on the belt.

Now, the pressure pad, the under- and over-platens, the under- and over-sets of linked crossbeams being all in place, slide the tie-bolts into the crossbeams from the left and right sides, e.g by hand—perhaps adjusting the lengths (e.g by hand) to enable the tie-bolts to slide in.

Adjust the lengths of the tie-bolts to take up the slack in the gap between the over- and under-sets of crossbeams.

Perform the splicing operation.

After splicing, withdraw the tie-bolts, and remove the apparatus.

As regards the FIG. 3 arrangement, the assembly and operation procedure might typically include the following instructions:—

Assemble the under-crossbeams in place under what will be the splice area (without linking the under-crossbeams together as a linked under-set).

Place the heater/cooler under-platen on the now-in-place unlinked under-crossbeams.

Place the two free ends of the belt over the under-set, in the correct ready-for-splicing juxtaposition.

Prepare the ends of the belt for splicing.

Place the heater/cooler over-platen and pressure pad over the now-prepared splice area.

Again without using the link-spacers, assemble the over-crossbeams in place over the already-assembled components on the belt.

Now, the pressure pad, the under- and over-platens, the under- and over-crossbeams being all in place, slide the tie-bolts into place, inserting the link-spacers 52 of the tie-bolts into the profiles of the crossbeams from the left and right sides, e.g by hand—perhaps adjusting the length, by hand, to enable the tie-bolts to slide in.

Adjust the lengths of the tie-bolts to take up the slack in the gap between the over- and under-crossbeams.

Perform the splicing operation.

After splicing, withdraw the tie-bolts, and remove the apparatus.

In this manner of assembly, the under-crossbeams are not linked together as an under-set (nor are the over-set of crossbeams linked together as an over-set) during placement of the crossbeams into the splice area. The under-crossbeams only become linked together as an under-set (and the over-crossbeams only become linked together as an over-set) after assembly.

In an alternative manner of assembly of the FIG. 3 configuration, the engineer might prefer to provide some additional link-spacers. These additional link-spacers need not have the threaded holes of the link-spacers 52. (The link-spacers are manufactured as extrusions, and the additional link-spacers are simply cut-off lengths of the extruded stock.)

The additional link-spacers may be incorporated into the FIG. 3 assembly typically by the following procedure:—

Using the additional link-spacers, link the under-set of crossbeams together as an under-set, and place that assembled under-set in place under what will be the splice area.

Place the heater/cooler under-platen on the under-set of linked under-crossbeams, now in place.

Place the two free ends of the belt over the under-platen, in the correct ready-for-splicing juxtaposition.

Prepare the ends of the belt for splicing.

Place the heater/cooler over-platen and pressure pad over the now-prepared splice area.

Using some further additional link-spacers, link the over-crossbeams together as an over-set of linked over-crossbeams, and lower that over-set down onto the belt, i.e onto the already-assembled components on the belt.

Now, the pressure pad, the under- and over-platens, the under- and over-sets of linked crossbeams being all in place, slide the tie-bolts (which include the nut link-spacers 52, with their threaded holes) into the crossbeams from the left and right sides, e.g by hand—perhaps adjusting the lengths (e.g by hand) to enable the tie-bolts to slide in.

Adjust the lengths of the tie-bolts to take up the slack in the gap between the over- and under-sets of crossbeams.

Perform the splicing operation.

After splicing, withdraw the tie-bolts, and remove the apparatus.

The engineer may choose whether to keep or leave the additional link-spacers in place, i.e not remove them, prior to inserting the tie-bolts with their included nut link-spacers 52.

Figure 4:
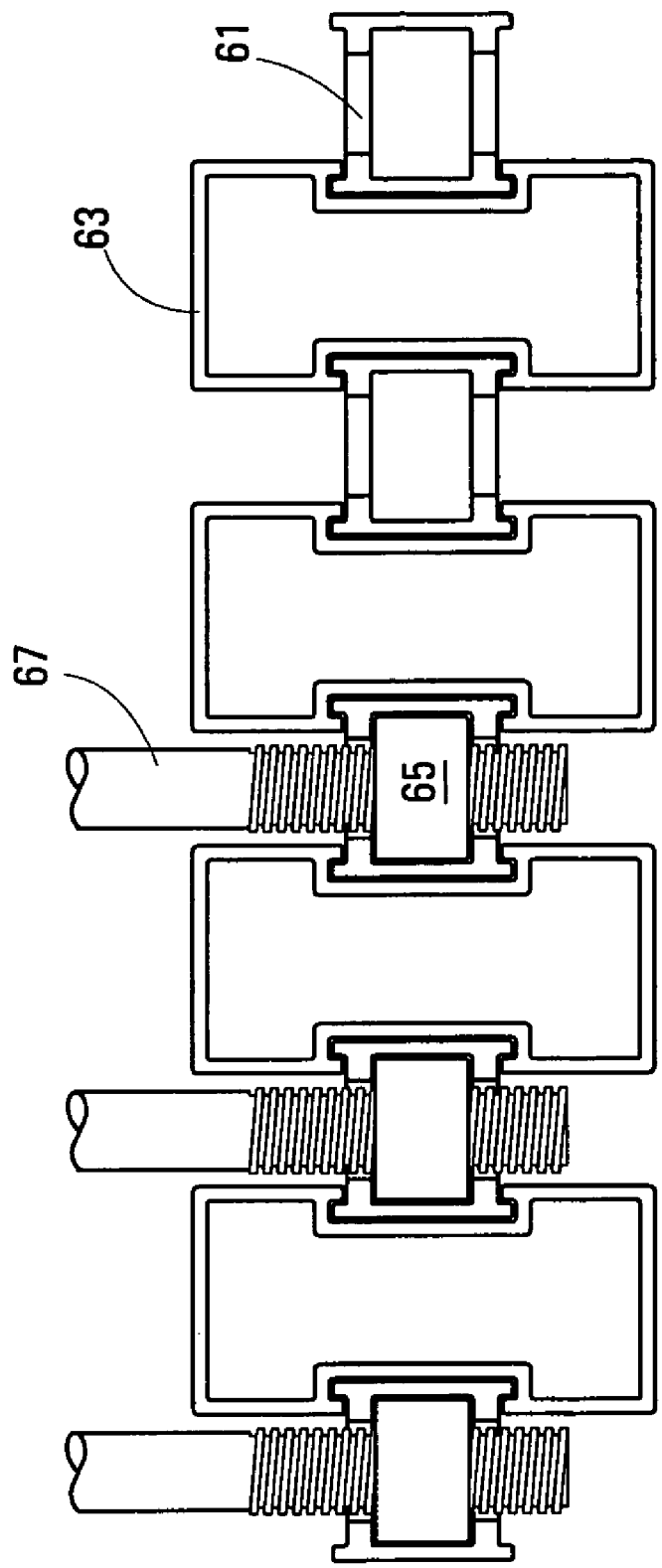
FIG. 4 is a side elevation of another splicer apparatus.

FIG. 4 shows what might be regarded as a combination of the FIG. 1 and the FIG. 3 configurations. In FIG. 4, each of the link-spacers 61 fits between two adjacent crossbeams 63, as in FIGS. 1 and 3. In FIG. 4, the nut 65 is a separate component from the link-spacer 61, and engages inside the link-spacer. Now, the over-crossbeams can be linked together as an over-set, the over-set being separate from the correspondingly-linked under-set of under-crossbeams. The tie-bolts 67 can be added later. FIG. 4 shows the stage where three of the tie-bolts 67 have been assembled, and the crossbeams 63 are held, by the link-spacers 61, as separate over-set and under-set, during the assembly of the tie-bolts.

In FIG. 4, as in FIG. 3, the end tie-bolts carry only half the load, with the benefits of that as described, and each crossbeam 63 is associated with two tie-bolts 67, whereby each crossbeam is still held by the one tie-bolt if the other tie-bolt should fail. That is to say, in FIG. 4, as in FIG. 3, assuming only one of the tie-bolts fails, each crossbeam is still held (i.e half-held) by one other tie-bolt.

Figure 5:
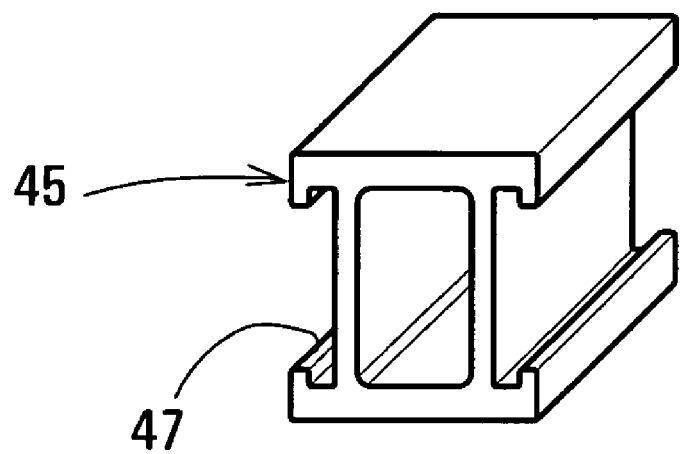
FIG. 5 is a pictorial view of a link-spacer component of the apparatus of FIG. 1.
Figure 6:
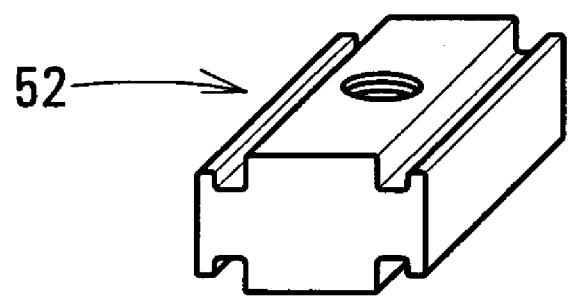
FIG. 6 is a pictorial view of a link-spacer component of the apparatus of FIG. 3.
Figure 7:
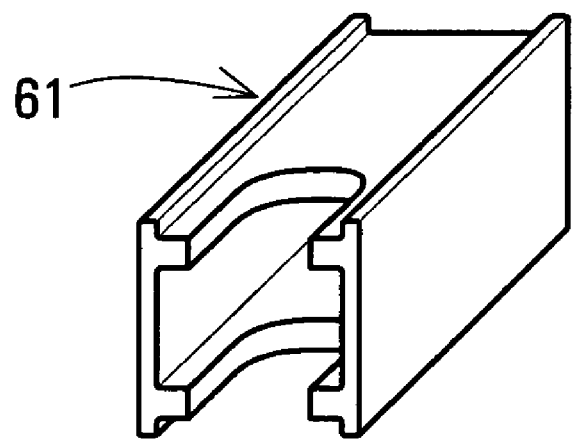
FIG. 7 is a pictorial view of a link-spacer component of the apparatus of FIG. 4.

FIGS. 5, 6, 7 are pictorial views of the link-spacers 45,52,61 respectively, as shown in FIGS. 1, 3, 4 respectively.

The tie-bolts as described are adjustable in order to enable the engineer to take up the slack, prior to operating the pressure pad. It is not essential that the tie-bolts (or, more generally, tie-bars) be adjustable for slack take-up purposes. In a case where the vertical height of the components between the beams is accurately known, e.g especially when the splicer apparatus is dedicated to a particular belt installation, and when the pressure pad itself has enough vertical travel to take up the slack, the tie-bars need not be adjustable. In such a case, the tie-bar need not be of a screw-threaded turnbuckle configuration, but rather can be simply a bar with hooks on the ends. In such a case, the engineer has no need to take up the slack after the tie-bars are in place, because the tie-bars are already of the correct length.

However, as a matter of commercial practice, usually the splicer cannot be dedicated to just one belt, and must cope with a number of belts, whereby the adjustability of the screw-threaded tie-bolts is preferred. Even if the splicer is dedicated to one belt, indeed, preferably the tie-bolts should be adjustable.

It is not essential that adjustability be provided by a screw-threaded turnbuckle arrangement. Other screw-thread configurations may be used, e.g a G-clamp arrangement. Other adjustment means, such as a ratchet bar, or the like, may alternatively be used.

It is not essential that the manner in which the tie-bolt (i.e the nut of the tie-bolt) engages the crossbeam (or the link-spacer) be as illustrated herein. In an alternative, the tie-rod is longer, and the nuts fit over the overall heights of the crossbeams or link-spacers. Whatever the configuration, preferably the crossbeams, the tie-bolts, and the link-spacers, should be symmetrical, whereby the engineer does not have to be concerned with whether the components are upside down or the wrong way round.

Figure 8:
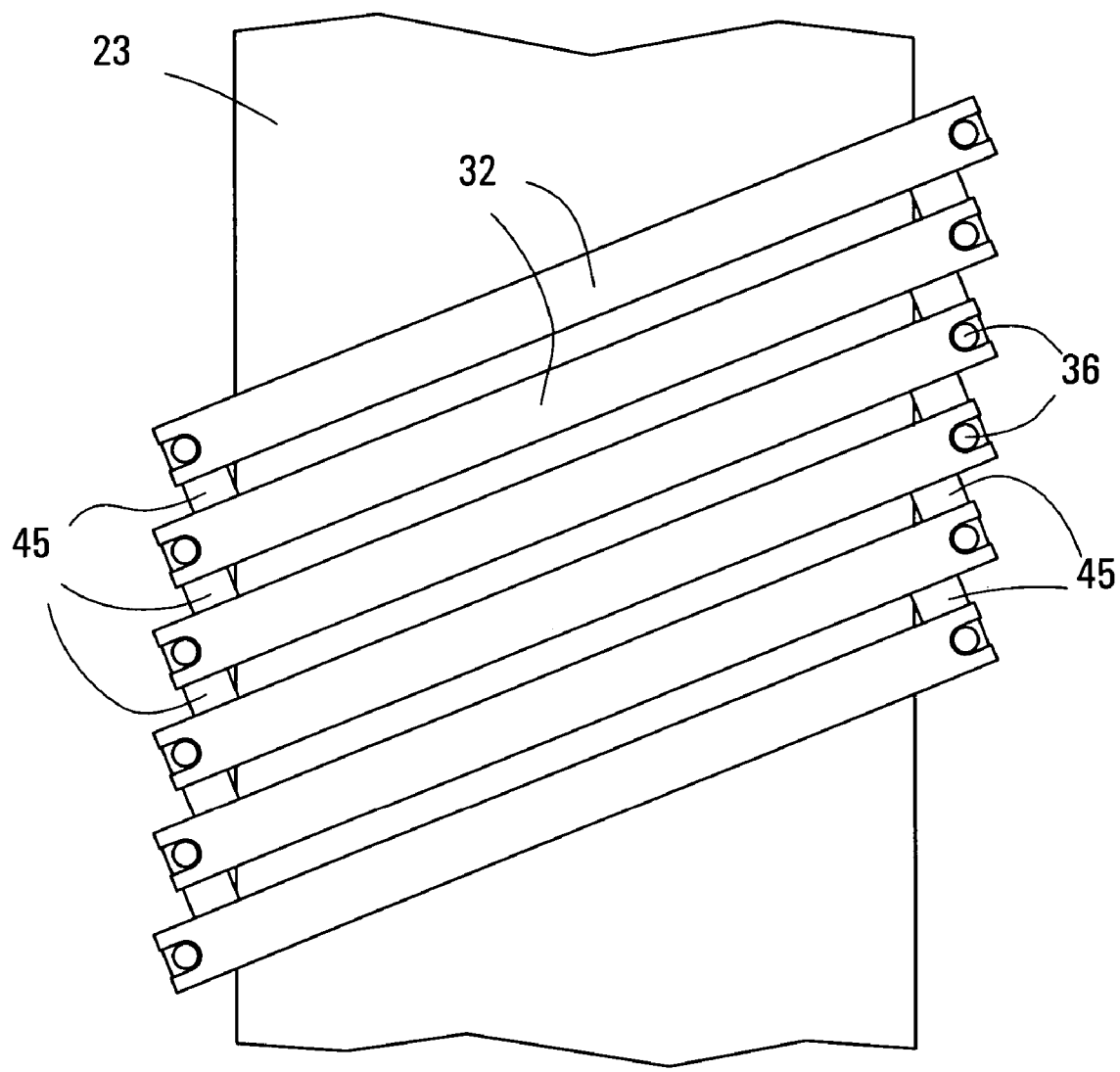
FIG. 8 is a modified plan view of the apparatus of FIG. 1.

It is common practice, in splicing, for the leading and trailing ends of the splice area not to be at right angles to the length of the belt. Rather, the leading and trailing ends of the splice are set at an angle (usually the same angle) to the lateral width of the belt. In that case, the crossbeams are set at the same angle. Often, the angle is twenty-two degrees, as in FIG. 8.

Where a belt splicer is to be used on a number of different belts, the splicer will have to cater for a number of different angles of the splice area, as well as different widths and thicknesses of the belts. The fact that the link-spacers are able to slide freely in the left/right direction along the profile of the cross-beams, as shown, is a simple way to accommodate this.

The crossbeams, link-spacers, and tie-bolts are all identical to each other. The apparatus as a whole is modular, in that if a greater length of splice area is needed, more sets of crossbeams, link-spacers, and tie-bolts are simply added. As mentioned, in a large splice, there may be thirty or forty sets straddling the belt, all held in the proper spaced-apart relationship by the presence of the link-spacers. It is recognised that the usually-desired distance apart of the crossbeams is ideally suited to the use of a link-spacer of the simple, highly robust, profile as illustrated.

Preferably, the crossbeams and link-spacers are extrusions in aluminum. Each crossbeam is light enough to be very easily manhandled into position by one person; if it is desired to lift e.g several of the over-crossbeams together as a single over-set (using a hoist), the fact that the crossbeams are linked together makes the operation simple.

It is normal good practice for the wall thickness of an aluminum extrusion to be reasonably uniform over the whole profile, and the requirements of the invention enable that preference to be followed, as shown in the profiles as illustrated. Especially in the area of the slide-guides between the link-spacers and the crossbeams, the designer should avoid large changes in section thickness. The shape of the slide-guides should be such that there is no tendency for the link-spacers to become jammed on the crossbeams, for any reason (including dirty components, wear and abuse, assembly mismatch, etc) and preferably the link-spacers should not become jammed even if they actually do operate to hold adjacent crossbeams together in the event of a tie-bolt failure.

The invention claimed is:

1. A belt splicer apparatus for splicing a splice-area of a conveyor belt, at which overlapping ends of the belt are spliced together, wherein:
   the apparatus includes crossbeams, including over-crossbeams disposed above the splice-area and under-crossbeams disposed below the splice-area;
   each crossbeam straddles across the splice-area of the belt;
   the apparatus includes an operable pressure-pad, which is so arranged in relation to the splice-area as to exert, when operated, a force tending to compress the splice-area, such force being supported against the crossbeams;
   the apparatus includes tie-bars, comprising left tie-bars and right tie-bars, which are so arranged in the apparatus as to react forces in the crossbeams arising from the operation of the pressure-pad, and to prevent the over-crossbeams from moving apart from the under-crossbeams;
   the apparatus includes link-spacers;
   the link-spacers are positioned in intercalated relationship between the crossbeams, whereby each link-spacer is located between adjacent crossbeams, and each crossbeam is located between adjacent link-spacers; and
   each link-spacer has a profile that is complementary to the profiles of the adjacent crossbeams, the profiles being so structured that the presence of the link-spacers constrains the adjacent crossbeams against movement relative to each other in the up/down direction.

2. Apparatus of claim 1, wherein the complementary profiles of the link-spacer and of the adjacent crossbeams are so structured that the presence of the link-spacers constrains the adjacent crossbeams against movement relative to each other in the lengthwise direction, being the direction of the length of the belt.

3. Apparatus of claim 2, wherein the complementary profiles of the link-spacer and of the adjacent crossbeams are so structured that the link-spacer can move relative to at least one of the crossbeams in the left/right direction.

4. Apparatus of claim 3, wherein the complementary profiles of the link-spacer and of the adjacent crossbeams are so structured that the link-spacer can be assembled to that said one crossbeam by sliding movement of the link-spacer relative to that one crossbeam in the left/right direction, and can be disassembled and separated from that one crossbeam by sliding movement in the reverse sense.

5. Apparatus of claim 3, wherein the complementary profiles of the link-spacer and of the two-adjacent crossbeams are so structured that the link-spacer is prevented from moving relative to the at least one crossbeam in all modes and directions of movement other than sliding movement of the link-spacer relative to that one over-crossbeam in the left/right direction.

6. Apparatus of claim 1, wherein all the link-spacers are physically separate from each other and identical to each other, all the tie-bars are physically separate from each other and identical to each other, and all the crossbeams are physically separate from each other and identical to each other.

7. Apparatus of claim 1, wherein:
the apparatus includes reaction-sets;
in respect of each reaction-set:
the reaction-set comprises a respective one of the over-crossbeams, a respective one of the under-crossbeams, a respective one of the left tie-bars, and a respective one of the right tie-bars;
forces tending to urge the crossbeams of that reaction-set apart are reacted through the left and right tie-bars of that reaction-set;
the reaction-sets lie in spaced-apart relationship relative to each other, along the length of the splice-area;
the apparatus is so arranged that, in the event of a failure of one of the tie-bars, the apparatus then enters a tie-bar failure mode;
in the tie-bar failure mode, the one of the reaction-sets that contains the failed tie-bar is termed the failed-reaction-set;
in the tie-bar failure mode, forces tending to urge the crossbeams of the failed-reaction-set apart are not reacted, whereby the over-crossbeam of the failed-reaction-set tends to move upwards; and
the effect of the presence of the link-spacers is to prevent the over-crossbeam of the failed-reaction-set from moving upwards as a result of the failure of the tie-bar.

8. Apparatus of claim 1, wherein the link-spacers and the crossbeams are formed as extrusions, in aluminum.

9. Apparatus of claim 1, wherein:
each tie-bar includes a tie-bolt;
the tie-bolt includes a tie-rod, which is formed with a left-hand-thread and a right-hand-thread, one towards each end of the tie-rod; and
the tie-bolt include a complementary left-hand-thread nut and a complementary right-hand-thread nut.

* * * * *